United States Patent
Xie et al.

(10) Patent No.: US 10,461,565 B2
(45) Date of Patent: Oct. 29, 2019

(54) DEFORMABLE ELECTRONIC DEVICE AND WIRELESS CHARGING SYSTEM

(71) Applicant: Lenovo (Beijing) Limited, Beijing (CN)

(72) Inventors: Bing Xie, Beijing (CN); Guangbin Li, Beijing (CN); Dongyang Wang, Beijing (CN); Xuhui Zhang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 412 days.

(21) Appl. No.: 15/371,919

(22) Filed: Dec. 7, 2016

(65) Prior Publication Data

US 2017/0163078 A1 Jun. 8, 2017

(30) Foreign Application Priority Data

Dec. 8, 2015 (CN) .......................... 2015 1 0897754

(51) Int. Cl.
*H02J 7/02* (2016.01)
*G04G 19/00* (2006.01)
*G04G 17/06* (2006.01)

(52) U.S. Cl.
CPC .............. *H02J 7/025* (2013.01); *G04G 17/06* (2013.01); *G04G 19/00* (2013.01)

(58) Field of Classification Search
CPC .......... H02J 7/025; G04G 19/00; G04G 17/06
See application file for complete search history.

(56) References Cited

U.S. PATENT DOCUMENTS

| | | | | |
|---|---|---|---|---|
| 9,362,776 | B2* | 6/2016 | Low | G04C 10/00 |
| 2013/0134274 | A1* | 5/2013 | Chen | H05K 5/0217 |
| | | | | 248/231.51 |
| 2014/0247148 | A1* | 9/2014 | Proud | H02J 7/025 |
| | | | | 340/870.02 |
| 2014/0285016 | A1* | 9/2014 | Tetu | H02J 7/0027 |
| | | | | 307/31 |
| 2014/0320076 | A1* | 10/2014 | Kwon | H02J 7/025 |
| | | | | 320/108 |
| 2014/0375465 | A1* | 12/2014 | Fenuccio | G08B 5/36 |
| | | | | 340/691.1 |
| 2015/0130411 | A1* | 5/2015 | Kim | G04C 10/00 |
| | | | | 320/108 |
| 2015/0229237 | A1* | 8/2015 | Davis | A45F 5/02 |
| | | | | 224/581 |
| 2015/0348697 | A1 | 12/2015 | Graham et al. | |
| 2016/0062319 | A1* | 3/2016 | Kim | G04C 10/00 |
| | | | | 368/204 |

(Continued)

FOREIGN PATENT DOCUMENTS

CN 103094992 A 5/2013
CN 203275899 U 11/2013

(Continued)

*Primary Examiner* — Pinping Sun
(74) *Attorney, Agent, or Firm* — Ference & Associates LLC

(57) ABSTRACT

An embodiment provides an electronic device comprising: a body; a battery disposed within the body; a first portion extending from the body; a second portion extending from the body; and a charging coil disposed within at least the first portion and the second portion that charges the battery. Other aspects are described and claimed.

19 Claims, 14 Drawing Sheets

(56) References Cited

U.S. PATENT DOCUMENTS

| | | | |
|---|---|---|---|
| 2016/0094082 A1* | 3/2016 | Ookawa | H01F 38/14 320/108 |
| 2016/0106370 A1* | 4/2016 | Filipovic | H04M 1/0254 340/870.07 |
| 2016/0139564 A1* | 5/2016 | Tsushima | G04R 60/04 368/282 |
| 2016/0141097 A1* | 5/2016 | Oo | H01F 27/2804 320/108 |
| 2016/0322854 A1* | 11/2016 | Jeong | H01F 41/071 |
| 2017/0000222 A1* | 1/2017 | Lee | A44C 5/147 |
| 2017/0005504 A1* | 1/2017 | Rho | H02J 7/025 |
| 2017/0033567 A1* | 2/2017 | Adamisin | H02J 7/025 |
| 2017/0127196 A1* | 5/2017 | Blum | H02J 50/80 |
| 2018/0220923 A1* | 8/2018 | Shim | G06F 1/163 |
| 2018/0259914 A1* | 9/2018 | Chae | G04G 17/00 |

FOREIGN PATENT DOCUMENTS

| | | | |
|---|---|---|---|
| CN | 203422610 U | | 2/2014 |
| CN | 103928969 A | | 7/2014 |
| CN | 204391836 U | | 6/2015 |
| CN | 104917301 A | * | 9/2015 |
| CN | 104917301 A | | 9/2015 |

\* cited by examiner

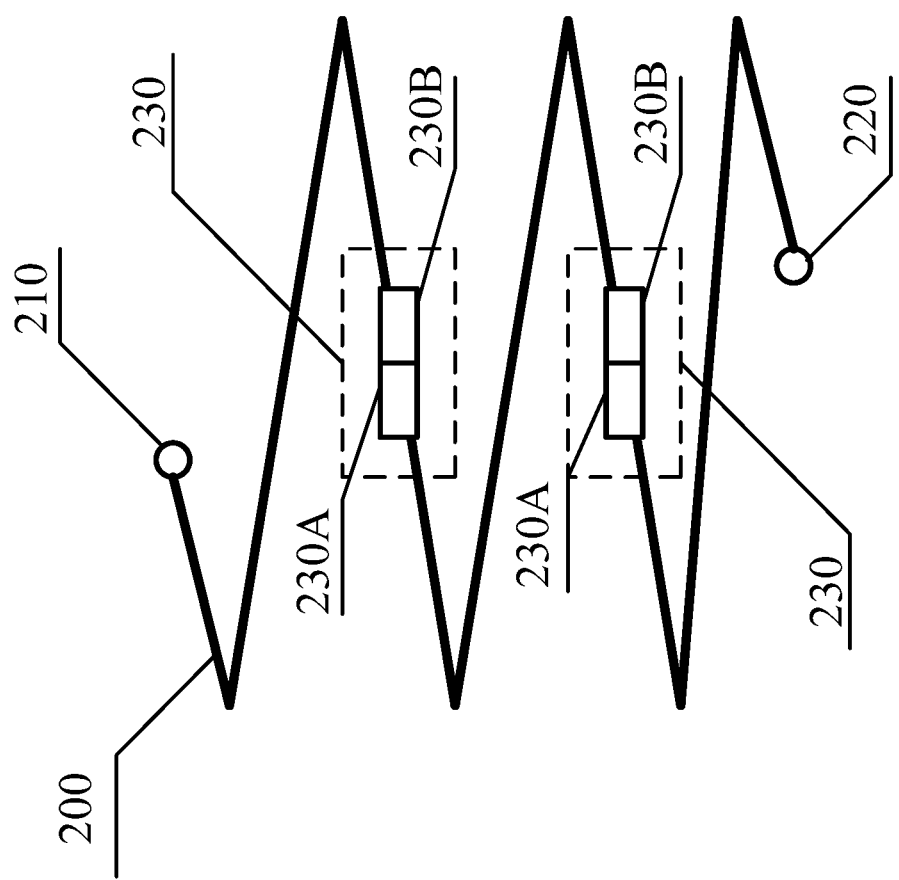

US 10,461,565 B2

DEFORMABLE ELECTRONIC DEVICE AND WIRELESS CHARGING SYSTEM

CLAIM FOR PRIORITY

This application claims priority to Chinese Application No. 201510897754.6, filed on Dec. 8, 2015, the contents of which are fully incorporated by reference herein.

TECHNICAL FIELD

The subject matter relates to the field of wireless charging technology, specifically to a deformable electronic device and wireless charging system.

BACKGROUND

With the continuous development of the electronics industry, wireless charging technology has been widely applied. For example, wireless charging technology is applied to deformable electronic devices so that deformable electronic devices can be wirelessly charged.

At present, the wireless charging coil within a deformable electronic device with wireless charging capability and other parts of the deformable electronic device are stacked. Being stacked means that all the parts in a deformable electronic device are installed layer by layer, and each part is located in a separate layer. For instance, in a smart watch with wireless charging capability, the parts are arranged from top to bottom in this order: screen, main board, battery, and wireless charging coil.

However, in the abovementioned configuration, the size of the charging coil is confined by the internal space of the deformable electronic device, resulting in low charging efficiency.

BRIEF SUMMARY

In summary, one aspect provides an electronic device comprising: a body; a battery disposed within the body; a first portion extending from the body; a second portion extending from the body; and a charging coil disposed within at least the first portion and the second portion that charges the battery.

Another aspect provides a method, comprising: attaching a first deformable part and a second deformable part to a body of an electronic device; and connecting a charging coil disposed in at least the first part and the second part to a charging chip within the body of the electronic device.

A further aspect provides a system, comprising: an electronic device comprising a body; a battery disposed within the body; a first portion extending from the body; a second portion extending from the body; and a charging coil disposed within at least the first portion and the second portion that charges the battery; and a charger that transfers a charge to the charging coil.

The foregoing is a summary and thus may contain simplifications, generalizations, and omissions of detail; consequently, those skilled in the art will appreciate that the summary is illustrative only and is not intended to be in any way limiting.

For a better understanding of embodiments, together with other and further features and advantages thereof, reference is made to the following description, taken in conjunction with the accompanying drawings, and the scope of the invention will be pointed out in the appended claims.

BRIEF DESCRIPTION OF THE SEVERAL VIEWS OF THE DRAWINGS

FIG. 3 is a structural schematic diagram of an embodiment.

FIG. 7b is the A-A section view of FIG. 7a.

DETAILED DESCRIPTION

It will be readily understood that the components of the embodiments, as generally described and illustrated in the figures herein, may be arranged and designed in a wide variety of different configurations. Thus, the following more detailed description of the embodiments of the apparatus, system, and method, as represented in FIGS. 1 through 10 is not intended to limit the scope of the embodiments, as claimed, but is merely representative of selected embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, to provide a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

Figure 1:
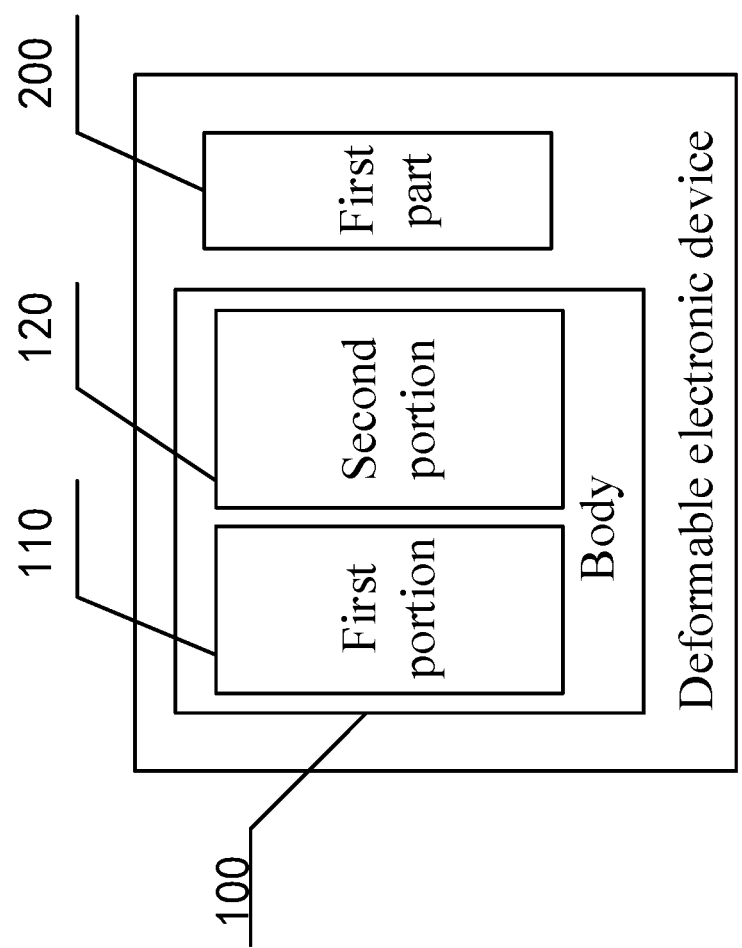
FIG. 1 is a structural schematic diagram of an example deformable electronic device according to an embodiment.

Referring to FIG. 1, an embodiment provides a deformable electronic device comprising a body 100 and a first part 200. The body 100 comprises a first portion 110 and a second portion 120, and an annular space is formed by the body 100 when the first portion 110 is connected with the second portion 120.

When the first portion 110 is not connected with the second portion 120, an annular space is not formed by the body 100. Specifically, the state in which an annular space is not formed by the body 100 can be referred to as the expanded state.

The definition of a detachable first portion and second portion is that the first portion and the second portion may be separated completely or partially. The first portion and the second portion can exist completely independent of each other after they are completely separated. The first portion and the second portion can still exist as a whole after they are partially separated, only that the annular space cannot be formed by the body in this state.

The first part 200 is arranged on the body 100, and specifically, can be arranged inside the body 100, wherein the first part 200 extends from the first portion 110 to the second portion 120, and the first coil is formed by the first part 200 within the annular space. Correspondingly, the coil is not formed by the first part 200 when the body 100 is in the expanded state. As the first coil is formed within the annular space, the diameter of the first coil is determined by the diameter of the annular space.

The diameter of the annular space formed by the body 100 may be fixed or adjustable, which may be determined by the manner in which the first portion 110 and the second portion 120 are connected. In the case where the deformable electronic device is a smart watch, the first portion 110 and the second portion 120 are the bands of the smart watch, and thus the diameter of the annular space can be adjusted by adjusting the bands.

Figure 2A:
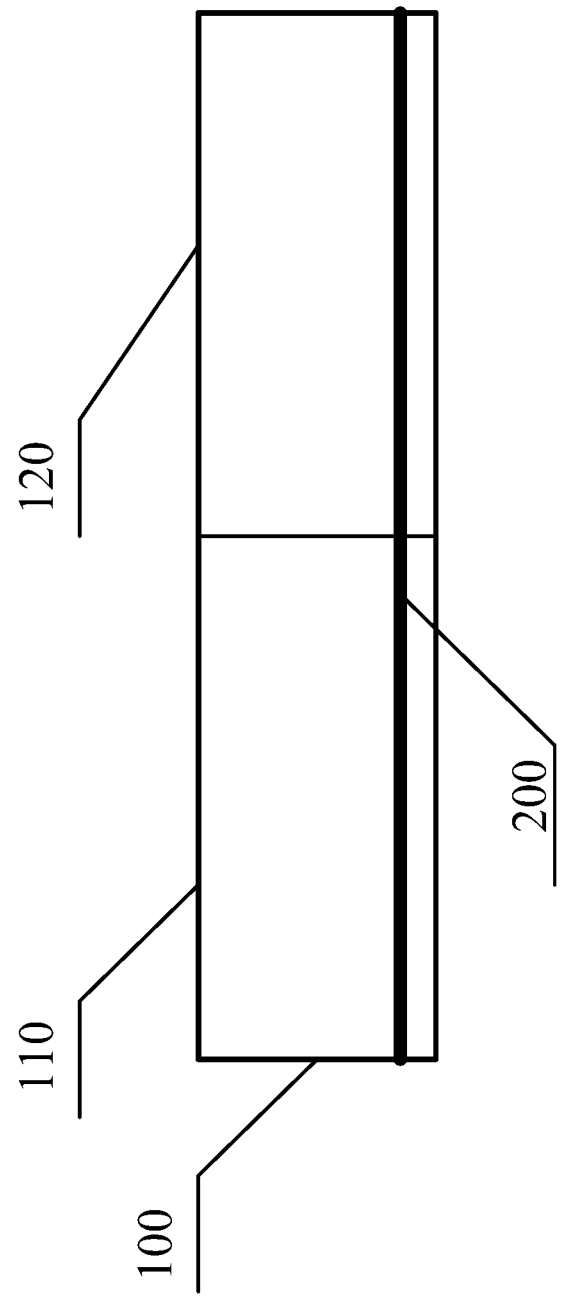
FIG. 2a is a schematic diagram of an example deformable electronic device according to an embodiment.
Figure 2B:
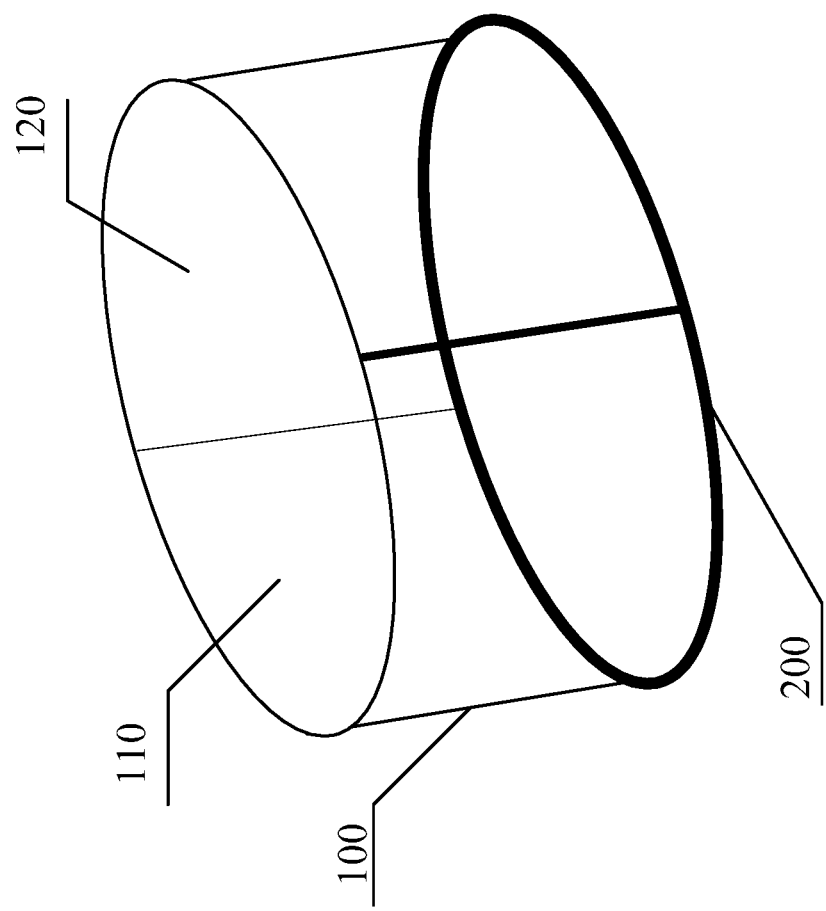
FIG. 2b is a schematic diagram of an example deformable electronic device according to an embodiment.

A deformable electronic device means that at least one part of the electronic device can be deformed, for example, smart watches, smart wristbands and flexible electronic devices and the like. An example deformable electronic device is a flexible electronic device as shown in FIG. 2a and FIG. 2b, which comprises the body 100 and the first part 200 (wherein the first part 200 may be arranged inside the body). FIG. 2a and FIG. 2b are intended to facilitate viewing the position of the first part in the body 100. The body 100 comprises the first portion 110 and the second portion 120, wherein the state of the body 100 when the first portion 110 is not connected with the second portion 120 is shown in FIG. 2a.

The first portion 110 and the second portion 120 may be two portions independent of each other, or one integrated structure. The body 100 can further comprise a third portion which connects with the first portion 110 and the second portion 120. For instance, if the deformable electronic device is a smart watch, the first portion 110 and the second portion 120 are the bands of the smart watch, while the third portion is the dial of the smart watch.

As shown in FIG. 2b, an annular space is formed by the body 100 when the first portion 110 is connected with the second portion 120. The first part 200 extends from the first portion 110 to the second portion 120, and the first coil is formed by the first part 200 when the annular space is formed by the body 100.

In order to show the state of the first coil formed by the first part 200 in the annular space, the first part 200 is arranged at the edge of the body 100 in FIG. 2b. The positions of the first part 200 in the body 100 are not limited and may be set as desired.

Hence, the first coil is formed within the annular space, and the size of the annular space is not limited by the internal space of the deformable electronic device, and thus the charging efficiency can be improved by adjusting the size of the annular space.

FIG. 3 is a structural schematic diagram showing an example of the first part 200. The first part 200 comprises a first interface 210, a second interface 220, and two pairs of terminals 230. The first part 200 comprises at least one pair of terminals. This embodiment includes two pairs of terminals as an example.

The first interface 210 and the second interface 220 are used for connecting with a charging chip. Specifically, a deformable electronic device can comprise the charging chip, i.e., the first interface 210 and the second interface 220 can be used for connecting with the charging chip of the deformable electronic device.

The pair of terminals 230 comprise a first terminal 230A and a second terminal 230B, wherein the first terminal 230A and the second terminal 230B are butt-joined together in the annular space so that the first coil can be formed by the first part 200. FIG. 3 illustrates the state of the first part in which the first terminal 230A and the second terminal 230B are butt-joined together within the annular space. As shown in FIG. 3, the first coil is formed by the first part 200 within the annular space.

The first terminal 230A and the second terminal 230B are butt-joined together when the first portion and the second portion of the body are connected; and they are separated when the first portion and the second portion are separated. In other words, the first terminal 230A is located on the first portion of the body, and the second terminal 230B is located on the second portion of the body. When the first portion and the second portion are connected so that an annular space is formed by the body, the first terminal 230A is butt-joined with the second terminal 230B; and when the first portion is separated from the second portion so that an annular space cannot be formed by the body, the first terminal 210A is separated from the second terminal 230B.

The structure of the first part as shown in FIG. 3 still acts as a whole corresponding to the body when the first portion is not connected with the second portion.

Figure 4:
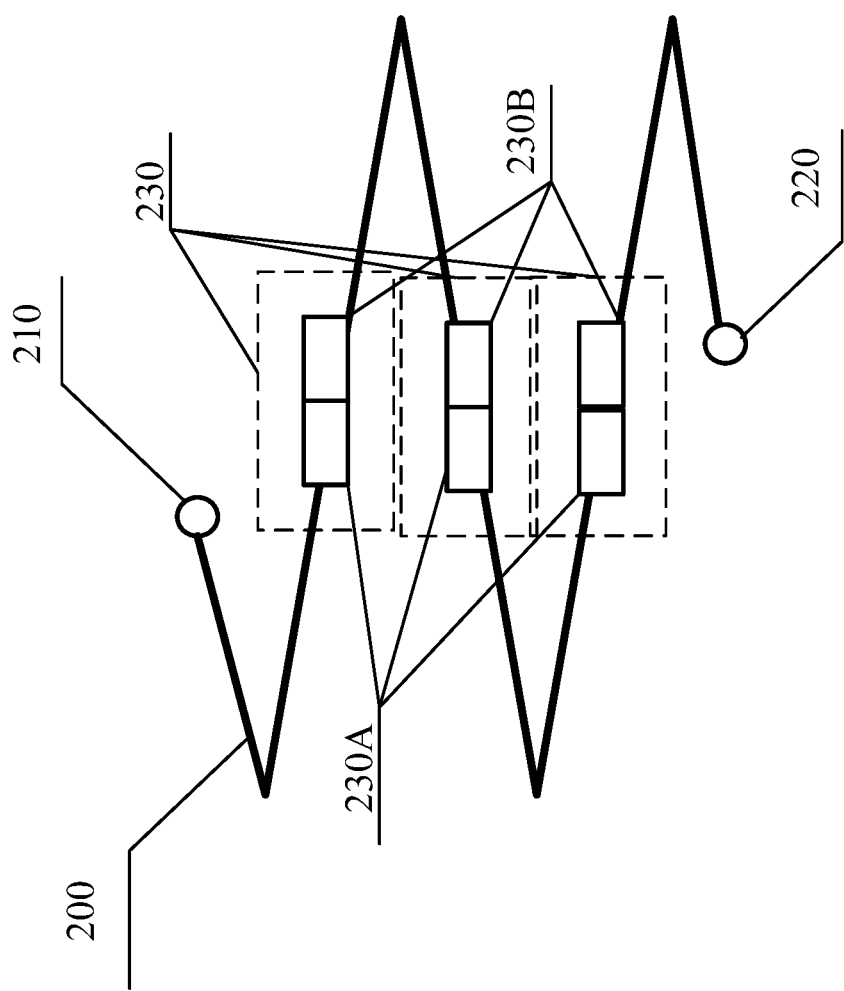
FIG. 4 is structural schematic diagram of an embodiment.

FIG. 4 shows a structural schematic diagram of the first part in another example, wherein the difference in the structure of the first part corresponding to FIG. 3 lies in that the structure of the first part as shown in FIG. 4 acts in the form of two independent portions corresponding to the body when the first portion is completely separated from the second portion.

The structure of the first part is not limited to the above two implementations, and all other structures capable of implementing the first part will fall within the scope of embodiments. For example, in another embodiment, the body of the deformable electronic device can further comprise a third portion which connects with the first portion and the second portion. Specifically, if the deformable electronic device is a smart watch, the first portion and the second portion correspond to the bands of the smart watch, and the third portion corresponds to the dial of the smart watch. In this structure, if the body can exist in the form of three independent portions, the number of terminal pairs of the first part will also be different. The specific structure will not be described herein in detail.

Figure 5:
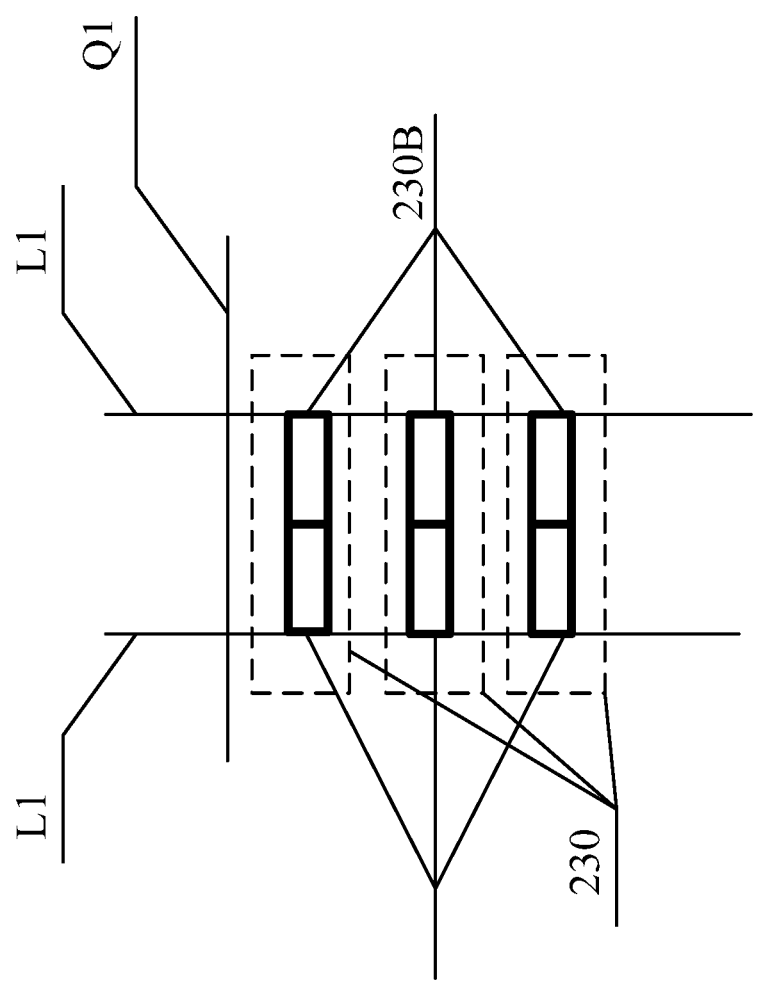
FIG. 5 is a schematic diagram of an embodiment.

An embodiment includes the first part comprising at least two pairs of terminals. One implementation of the terminals of the first part is as shown in FIG. 5. The first terminal 230A of each pair of terminals 230 is located on the first baseline L1, and the second terminal 230B of each pair of terminals 230 is located on the second baseline L2.

The first baseline L1 and the second baseline L2 are lines perpendicular to the tangent line Q1 of the annular space, and parallel to each other within the annular space.

Figure 6:
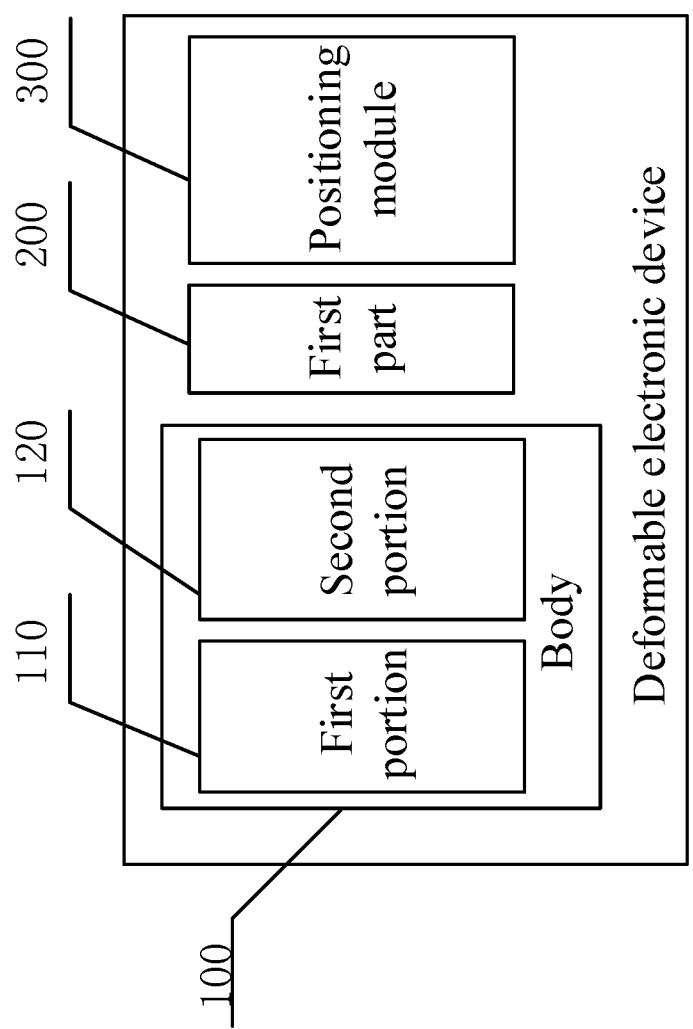
FIG. 6 is a structural schematic diagram of a deformable electronic device according to an embodiment.

To implement the accurate joining of the first terminal and the second terminal, as shown in FIG. 6, a deformable electronic device comprises: a body 100, a first part 200 and a positioning module 300; wherein the body 100 comprises a detachable first portion 110 and second portion 120, and an annular space is formed by the body 100 when the first portion 110 is connected with the second portion 120.

The first part 200 is arranged on the body 100, and specifically can be arranged inside the body 100. The first part 200 extends from the first portion 110 to the second portion 120, and the first coil is formed by the first part within the annular space.

The first part 200 comprises a first interface, a second interface and at least a pair of terminals. The first interface and the second interface are used for connecting with a charging chip. The deformable electronic device may comprise the charging chip. A pair of terminals comprises a first terminal and a second terminal, and the first terminal and the second terminal are butt-joined together within the annular space so that the first coil can be formed by the first part.

The positioning module 300 is arranged on the body 100, and specifically, can be arranged on the first portion 110 and/or second portion 120 of the body 100, and is used for positioning the first terminal and the second terminal to the first position when the annular space is formed by the body. The first position is a position to facilitate the butt joint of the first terminal with the second terminal.

The position of the positioning module on the body is not limited, and can be set as desired, as long as an accurate joining of the first terminal and the second terminal can be guaranteed. For instance, when the deformable electronic device is a smart watch, the positioning module may be arranged on the bands as a buckle to facilitate the bands connecting with each other.

The deformable electronic device comprises a body and a first part arranged on the body, wherein the body comprises a detachable first portion and second portion, and an annular space is formed by the body when the first portion is connected with the second portion, while the first part extends from the first portion to the second portion, forming a first coil within the annular space. As the first coil is formed within the annular space, and the size of the annular space is not limited by the internal space of the deformable electronic device, thus the charging efficiency can be improved by adjusting the size of the annular space. Furthermore, accurate joining of the first terminal and the second terminal can be implemented through the positioning module.

If the first part and other parts of the deformable electronic device are arranged in a stacked manner, they will have a direct impact on the thickness of the deformable electronic device, which makes it difficult for the deformable electronic device to be thinner. To address this problem, an embodiment provides a deformable electronic device, and the deformable electronic device comprises: a body, a first part and a second part; wherein: the body comprises a detachable first portion and second portion, and an annular space is formed by the body when the first portion is connected with the second portion.

The first part is arranged on the body, and specifically, can be arranged inside the body, wherein the first part extends from the first portion to the second portion, and a first coil is formed by the first part within the annular space.

The second part comprises one or more parts other than the first part in the deformable electronic device. For example, the second part can specifically comprise a main-board part and/or a battery part.

The first part is arranged in the first reserved space inside the body, and the second part in the second reserved space inside the body.

The first surface of the body has a first local area and a second local area. The first local area corresponds to the first reserved space, and the second local area to the second reserved space. The first local area and the second local area do not overlap with each other.

The position of the first part in the body is not limited. In one example, the first local area corresponding to the first reserved space may be located at the first position of the body, and the first position is the edge position of the body when an annular space is formed by the body. The first surface is the inner wall or the outer wall of the body when the annular space is formed by the body.

Figure 7A:
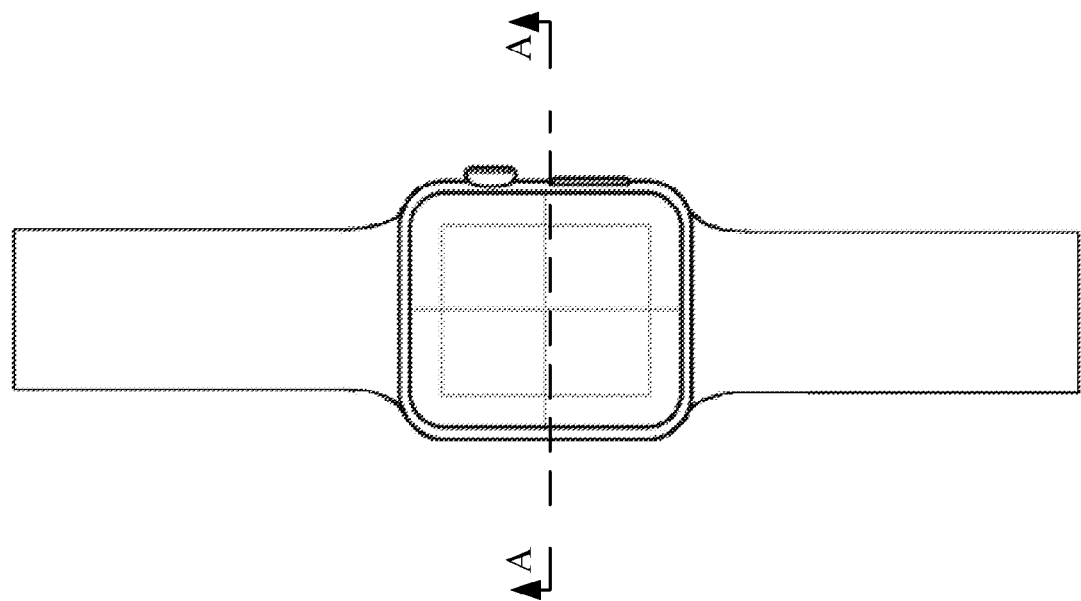
FIG. 7a is a schematic diagram of an example deformable electronic device according to an embodiment.
Figure 7B:
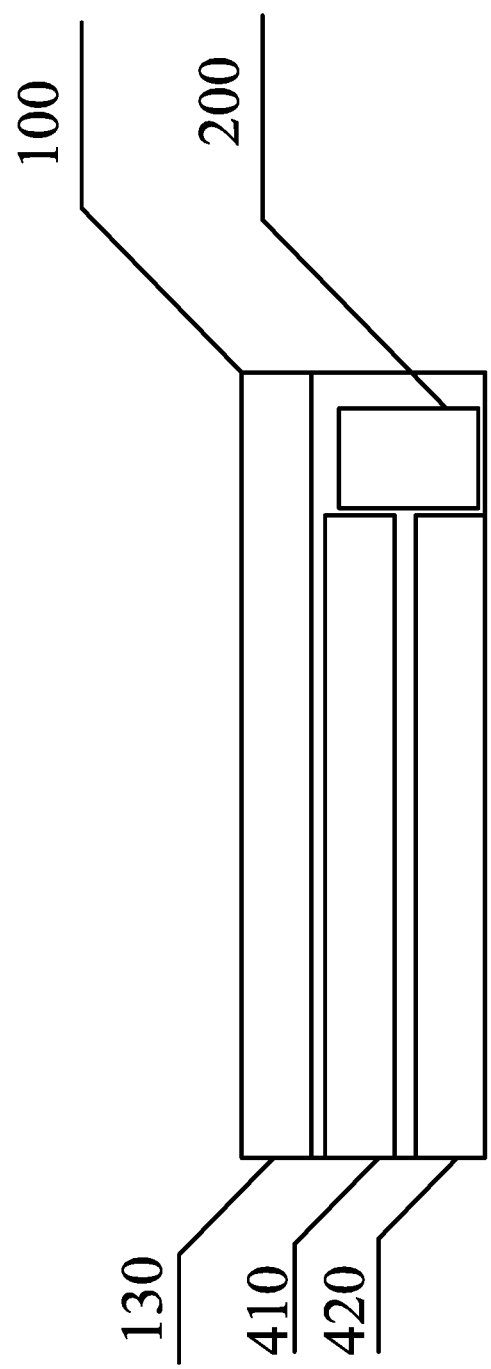
Figure 7C:
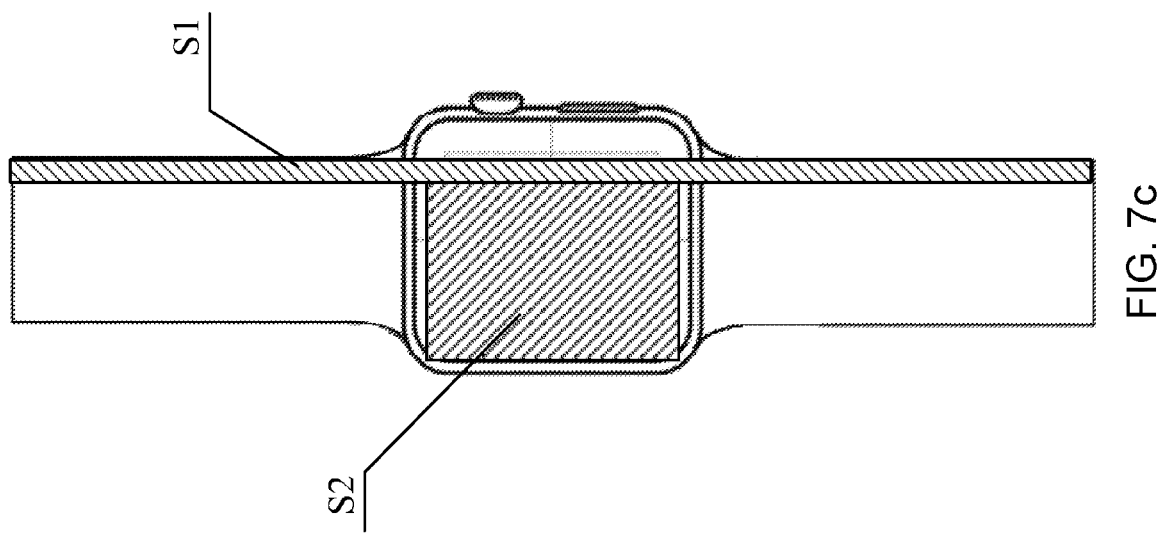
FIG. 7c is a schematic diagram of an example deformable electronic device according to an embodiment.

Referring to FIGS. 7a-7c, wherein FIG. 7b is an A-A section view of FIG. 7a, the body 100 comprises a screen 130. The first part 200 is arranged in the first reserved space inside the body 100, and the second part comprises a main-board part 410 and a battery part 420 that are arranged in the second reserved space inside the body 100.

As shown in FIG. 7c, the first surface of the body has a first local area S1 and a second local area S2. The first local area S1 corresponds to the first reserved space, and the second local area S2 to the second reserved space, wherein the first local area S1 and the second local area S2 do not overlap with each other.

In the above example, the first part no longer occupies the space in the deformable electronic device along the thickness direction, but rather it occupies the space in the deformable electronic device along the width direction, i.e., occupying the space not used by the second part in the width direction, thereby reducing the thickness of the deformable electronic device and facilitating development of the deformable electronic device to be thinner.

In the wireless charging process of the deformable electronic device, the electromagnetic field generated by the first coil will affect the normal operation of electronic devices. To solve this problem, in an embodiment, the deformable electronic device further comprises a shielding layer, which is arranged inside the body for covering the parts inside the body except for the first part. The material of the shielding layer is not limited. For example, the shielding layer can be specifically made of ferrite materials.

Figure 8:
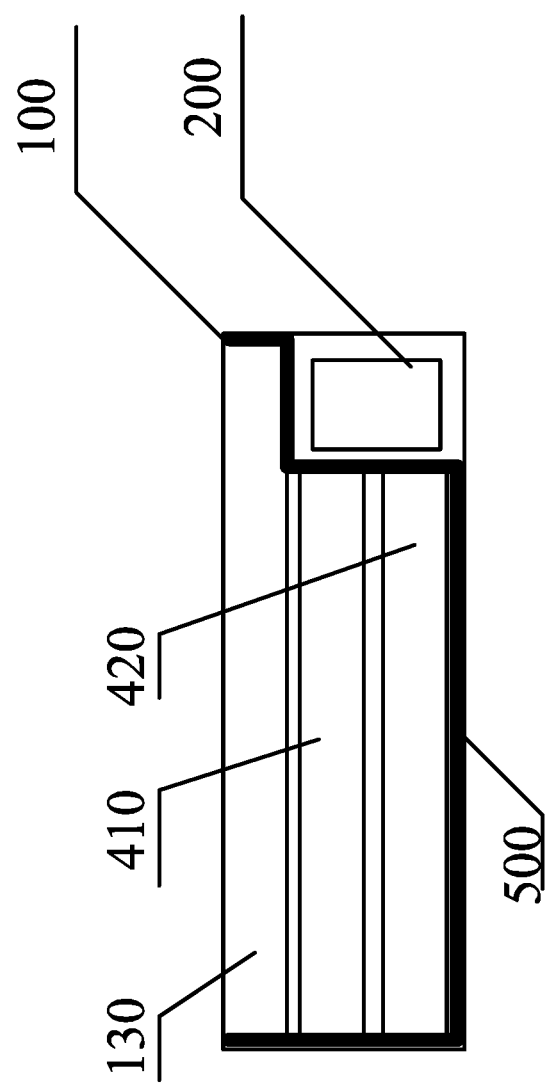
FIG. 8 is an internal structural schematic diagram of an embodiment.

An example of the shielding layer covering the parts inside the body, except for the first part, is shown in FIG. 8. The deformable electronic device comprises a body 100, a first part 200, a main-board part 410, a battery part 420, and a shielding layer 500, wherein the body 100 comprises a screen 130. The shielding layer 500 is arranged inside the body 100 and covers the screen 130, the motherboard part 410 and the battery part 420 inside the body 100. In this embodiment, the influence of the electromagnetic field generated by the first coil on the electronic parts in the deformable electronic device may be reduced by the shielding layer.

Figure 9:
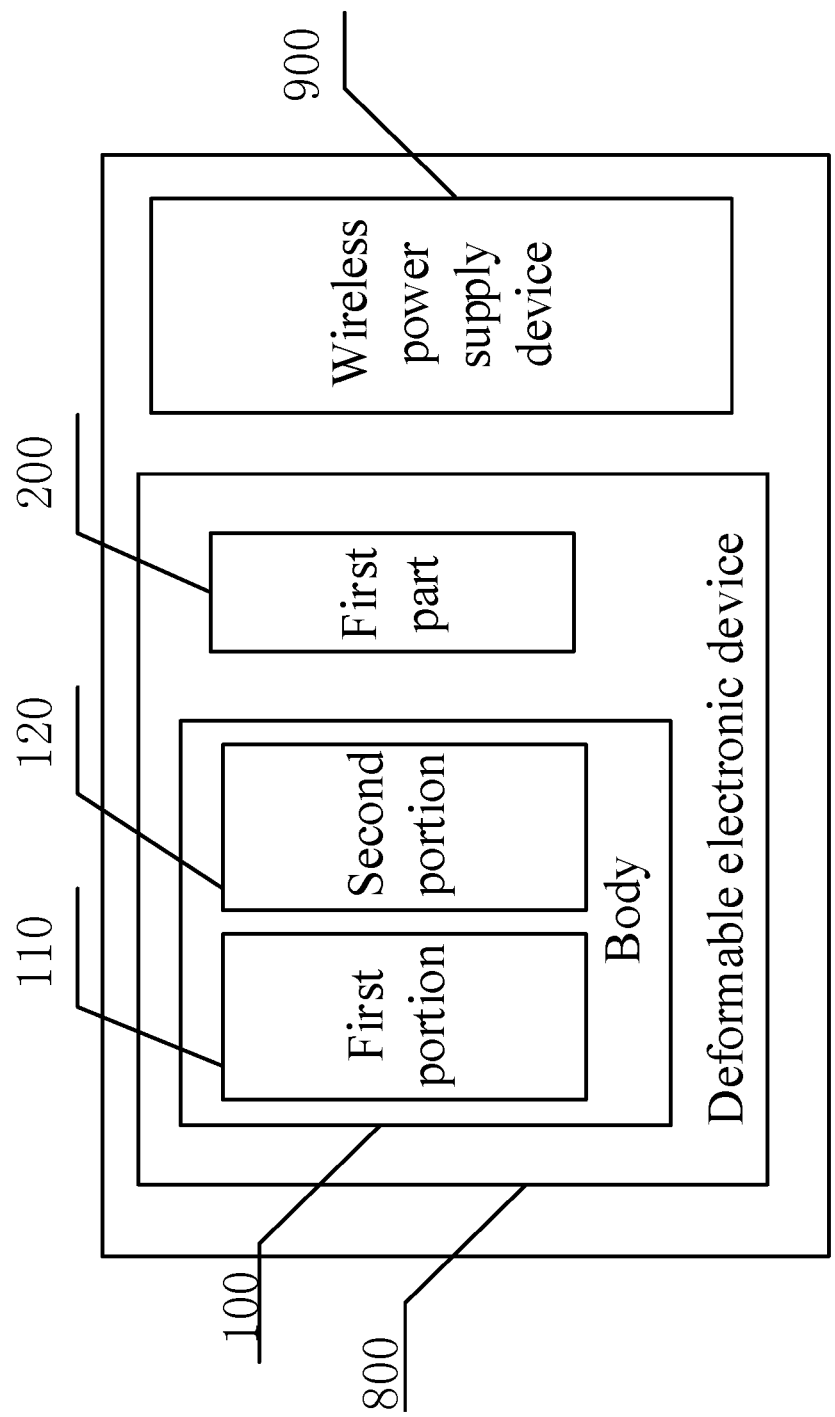
FIG. 9 is a structural schematic diagram of an example wireless charging system according to an embodiment.

An embodiment provides a wireless charging system. As shown in FIG. 9, the wireless charging system comprises: a deformable electronic device 800 and a wireless power supply device 900 used for charging the deformable electronic device 800. The deformable electronic device 800 comprises: a body 100 and a first part 200 arranged inside the body. The body 100 comprises a detachable first portion 110 and second portion 120, and an annular space is formed by the body 100 when the first portion 110 is connected with the second portion 120. The first part 200 extends from the first portion 110 to the second portion 120, wherein the first coil is formed by the first part 200 within the annular space.

The wireless power supply device 900 comprises a second coil, and the wireless power supply device may charge the deformable electronic device through the first coil and the second coil when the relative positions of the first coil and the second coil comply with preset positions. In this embodiment, the first coil is formed within the annular space, and the size of the annular space is not limited by the space of the deformable electronic device itself. Thus, the charging efficiency can be improved by adjusting the size of the annular space.

An embodiment provides an example for the first part of the above-mentioned example deformable electronic device, comprising: a first interface, a second interface and at least one pair of terminals. The first interface and the second interface are used for connecting with a charging chip. The deformable electronic device can comprise the charging chip. The pair of terminals comprises a first terminal and a second terminal, wherein the first terminal and the second terminal are butt-joined together within the annular space so that the first coil can be formed by the first part.

When the first part comprises at least two pairs of terminals, the first terminal of each pair of terminals can be all located on the first baseline, and the second terminal of each pair of terminals can be all located on the second baseline. The first baseline and the second baseline are lines perpendicular to the tangent line of the annular space, and are parallel to each other within the annular space.

In the wireless charging process of the deformable electronic device, the electromagnetic field generated by the first coil will affect the normal operation of electronic devices. To solve this problem, a shielding layer may be arranged inside the body of the deformable electronic device. In an embodiment, the deformable electronic device further comprises a shielding layer, which is arranged inside the body for covering the parts inside the body except for the first part.

Figure 10A:
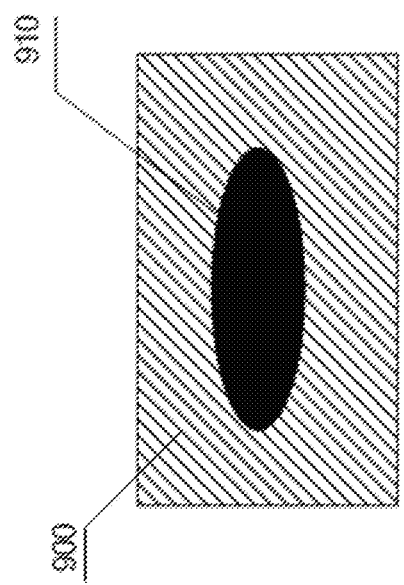
FIG. 10a is the top view of an example wireless power supply device according to an embodiment.
Figure 10B:
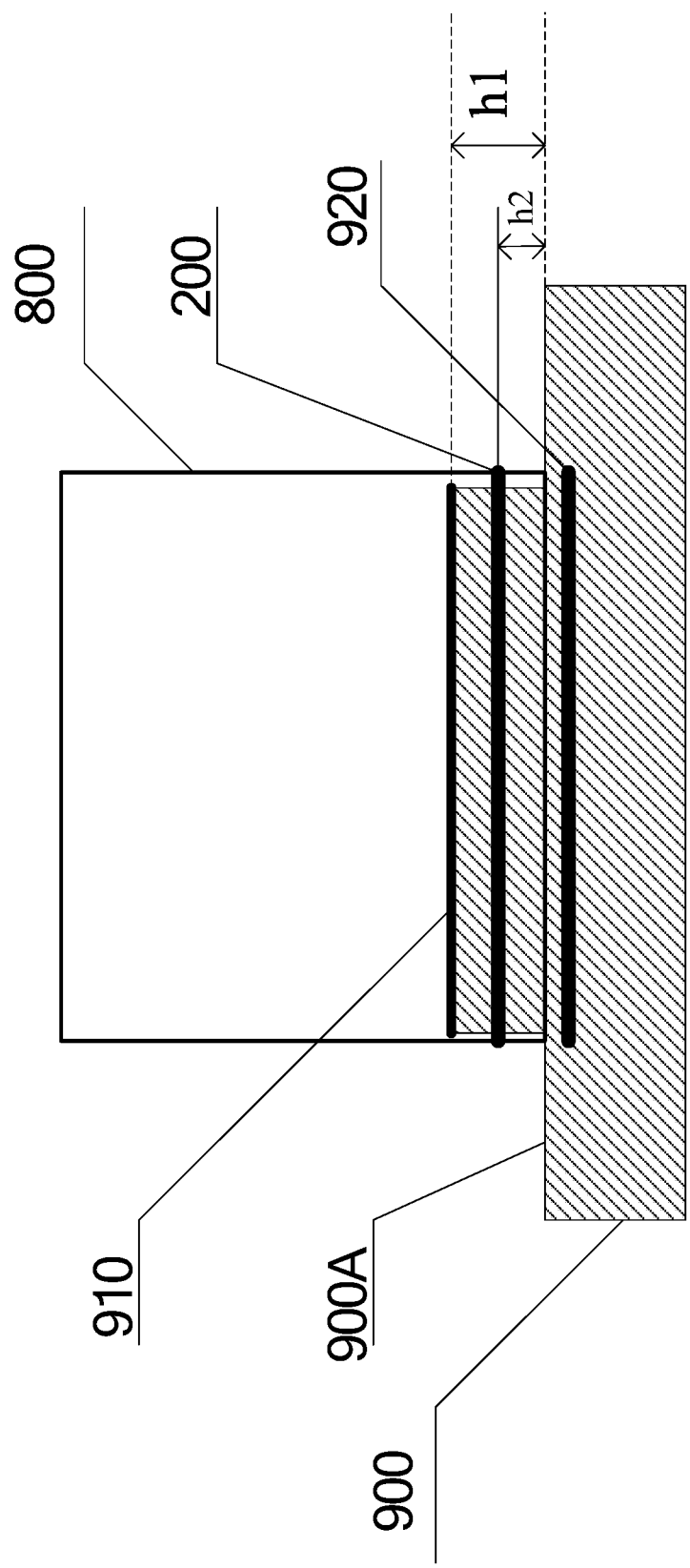
FIG. 10b is the side view of an example wireless power supply device and example deformable electronic device according to an embodiment.

As another example, a shielding layer can be arranged on the wireless charging device. An example wireless charging system as shown in FIG. 10a and FIG. 10b, wherein FIG. 10a is a top view of the wireless charging device, and FIG. 10b is a side view of the wireless charging device charging the deformable electronic device.

The shielding layer 910 is arranged on the first area of the wireless power supply device 900. The first area is the area surrounded by the annular space on the wireless charging device, and the shape and size of the first area can be consistent with the shape and size of the annular space.

To implement the charging of the deformable electronic device 800 by the wireless power supply device 900, the position relations of the first coil 200 and the second coil 920 of the wireless power supply device 900 must comply with preset position relations. For example, the distance between the first coil and the second coil being less than a certain distance, and/or the first coil and the second coil being arranged corresponding to each other.

Under the condition where the position relations between the first coil 200 and the second coil 920 comply with preset position relations, the deformable electronic device 800 is in contact with the first surface 900A of the wireless charging device 900, and the distance between the first coil 200 and the first surface 900A is the second height h2.

The distance between the shielding layer 910 and the first surface 900A of the wireless power supply device 900 is the first height h1, wherein the first height h1 is greater than the second height h2 in order to shield the influence of the electromagnetic field generated by the first coil on other electronic parts of the deformable electronic device through the shielding layer in the wireless charging process.

Although example embodiments have been described, those skilled in the art may make additional alterations and modifications on these embodiments. Therefore, the appended claims are intended to be interpreted as covering the example embodiments, including equivalents and all alterations and modifications falling within the ability of those having skill in the art.

It will be apparent to those skilled in the art that various modifications and variations can be made to the example embodiments without departing from the spirit and scope of the disclosure. In view of the foregoing, the non-limiting example embodiments are to be construed as covering modifications and variations thereof.

What is claimed is:

1. An electronic device comprising:
   a body;
   a plurality of electronic components disposed within the body, wherein the plurality of electronic components comprise a battery;
   a first portion extending from the body;
   a second portion extending from the body;
   a shielding layer covering the plurality of electronic components disposed within the body; and
   a charging coil disposed within the body, the first portion, and the second portion that charges the battery, wherein the charging coil is positioned at an inner peripheral edge of the first portion and the second portion;
   wherein a conductive line of the charging coil has a deformable helical shape and surrounds the inner peripheral edge of the first portion and the second portion, the conductive line being formed from a plurality of parallel, butt-jointed terminals located inside the conductive line.

2. The electronic device of claim 1, wherein the first portion and the second portion attach to one another at an ends thereof distal to the body.

3. The electronic device of claim 2, wherein an annular space is formed by the body, the first portion and the second portion when the first portion is attached with the second portion.

4. The electronic device of claim 3, wherein the first portion and the second portion form a watch band.

5. The electronic device of claim 2, wherein the first portion and the second portion attach via an interface.

6. The electronic device of claim 1, wherein the first portion and the second portion are deformable.

7. The electronic device according to claim 1, wherein the body comprises a main-board.

8. The electronic device of claim 1, wherein the electronic device is a smart watch.

9. A method, comprising:
   attaching a first deformable portion and a second deformable portion to a body of an electronic device, wherein the body comprises a plurality of electronic components, the plurality of electronic components comprising a battery; and
   connecting a charging coil disposed in the body, the first portion and the second portion to a charging chip within the body of the electronic device, wherein the charging coil is positioned at an inner peripheral edge of the first portion and the second portion;
   wherein a conductive line of the charging coil has a deformable helical shape and surrounds the inner peripheral edge of the first portion and the second portion, the conductive line being formed from a plurality of parallel, butt-jointed terminals located inside the conductive line.

10. The method of claim 9, wherein the first portion and the second portion attach to one another at an ends thereof distal to the body.

11. The method of claim 10, wherein an annular space is formed by the body, the first portion and the second portion when the first portion is attached with the second portion.

12. The method of claim 9, wherein the first portion and the second portion attach via an interface.

13. The method of claim 9, wherein the first portion and the second portion form a watch band.

14. The method of claim 9, wherein the body comprises a main-board attached to the charging chip.

15. The method of claim 9, comprising providing a shielding layer.

16. The method of claim 15, wherein the providing comprises disposing the shielding layer within the body of the electronic device.

17. A system, comprising:
an electronic device comprising a body; a battery disposed within the body; a first portion extending from the body; a second portion extending from the body; and a charging coil disposed within the body, the first portion and the second portion that charges the battery, wherein the charging coil is positioned at an inner peripheral edge of the first portion and the second portion; and
a charger that transfers a charge to the charging coil;
wherein the body comprises a plurality of electronic components, the plurality of electronic components comprising a battery;
wherein a conductive line of the charging coil has a deformable helical shape and surrounds the inner peripheral edge of the first portion and the second portion, the conductive line being formed from a plurality of parallel, butt-jointed terminals located inside the conductive line.

18. The system of claim 17, wherein the charger transfers the charge wirelessly.

19. The system of claim 17, wherein the electronic device is a smart watch.

* * * * *